Sept. 13, 1966     J. S. ANDRESEN ET AL     3,273,059
THERMAL CONVERTER TYPE R.M.S. METER UTILIZING
SIGNAL STORAGE AND COMPARISON
Filed Oct. 4, 1962                    2 Sheets-Sheet 1
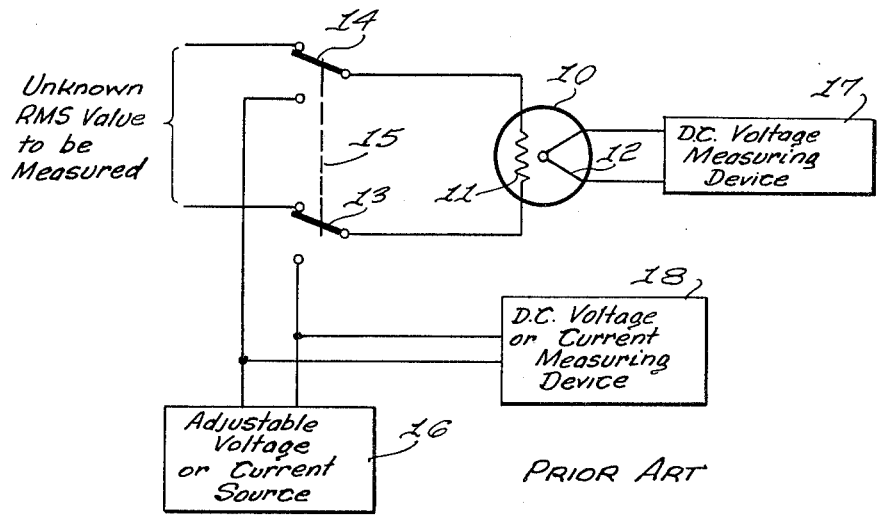
PRIOR ART
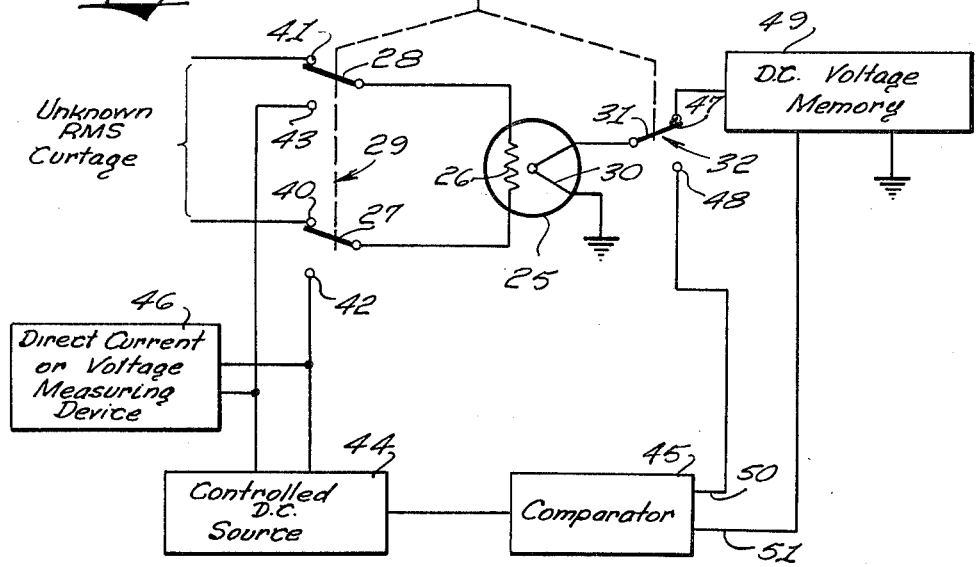
INVENTORS.
JACK S. ANDRESEN,
ALAN B. MACLANE,
By Louis J. Knobbe
ATTORNEY.

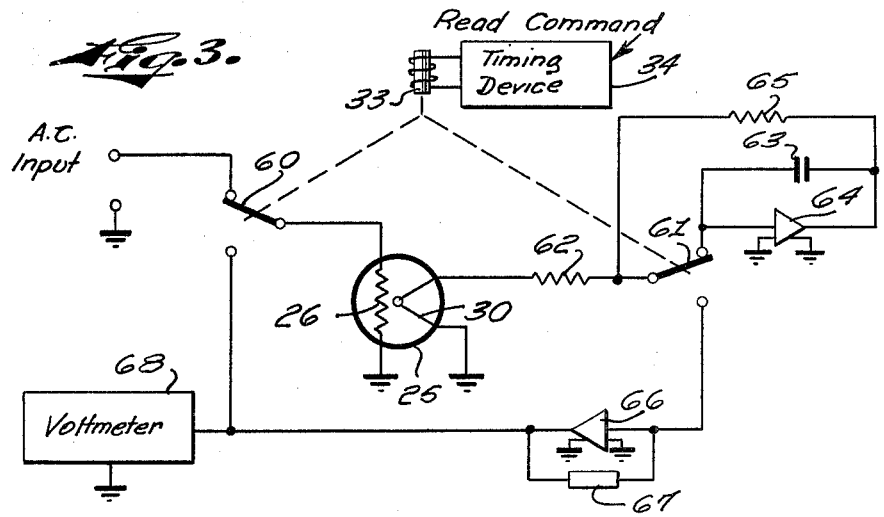
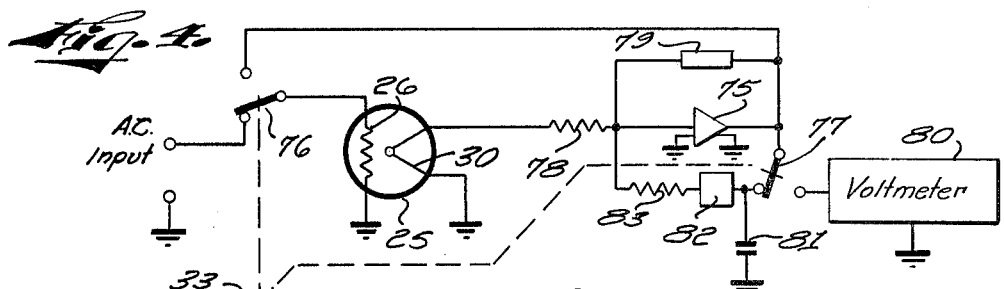
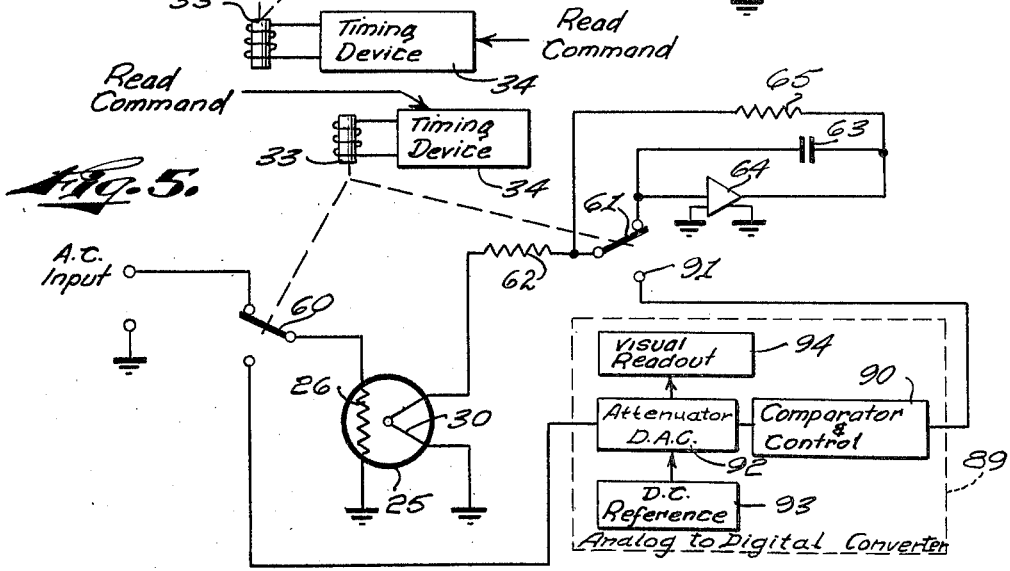
INVENTORS.
JACK S. ANDRESEN,
ALAN B. MACLANE,
BY Louis J. Knobbe
ATTORNEY.

United States Patent Office 3,273,059
Patented Sept. 13, 1966

3,273,059
THERMAL CONVERTER TYPE R.M.S. METER UTILIZING SIGNAL STORAGE AND COMPARISON
Jack S. Andresen, Pinole, and Alan B. MacLane, Pleasant Hill, Calif., assignors to Beckman Instruments, Inc., a corporation of California
Filed Oct. 4, 1962, Ser. No. 228,371
16 Claims. (Cl. 324—106)

The present invention relates to meters for measuring the root mean square (R.M.S.) value of an input electrical signal and, more particularly, to such devices which operate in a completely automatic manner so as to require no operator attention during a measurement sequence.

A representative prior art meter for measuring the R.M.S. value of an electrical current or voltage is shown in FIG. 1 and comprises a thermal converter element 10 having a resistance heating element 11 and a thermocouple 12. The thermocouple 12 ordinarily comprises the junction of two metals which generate a thermal electric electromotive force when the junction of the dissimilar conductors is heated. The resistance element 11 is connected to respective movable contacts 13, 14 of double pole, double throw switch 15. Switch 15 allows the resistance element 11 to be selectively connected to either the input signal or to an adjustable current or voltage source 16.

In use, the prior art device is initially connected as shown in FIG. 1 with the unknown signal applied to the resistance element 11 of the thermal converter 10. The output of the thermocouple 12 is measured by a D.C. voltage measuring device 17. Switch 15 is then thrown to its opposite position so as to connect the adjustable source 16 to the resistance element 11. This source is adjusted until the indication of the thermocouple measuring device 17 is the same as it was for the unknown alternating current input signal. The output of the adjustable source is then measured by an accurate D.C. voltage or current measuring device 18. Within the limits of measuring accuracy, resolution and transfer accuracy of the thermal converter 10, this final measured value is equal to the R.M.S. value of the unknown alternating current input signal.

Although the system shown in FIG. 1 provides an accurate means for measuring the R.M.S. values of alternating current signals, the system is quite inconvenient because of the number of operations that the operator must accomplish. Obviously, these operations limit the number of measurements which can be made in a given time and obviate unattended operation of the instrument and in addition increase the possibility that errors will be committed during a measurement sequence.

Another type of non-automatic system for measuring the R.M.S. value of an electrical current or voltage is described in U.S. Patent No. 2,805,394.

Previous attempts to automate the measuring sequence, such as the system shown in U.S. Patent No. 2,857,569—Gilbert et al, have one or more shortcomings. Thus, the Gilbert et al system requires both an input and a feedback thermal converter. Variations between these converters will cause erroneous measurements. Moreover, an additional thermal converter increases the complexity and cost of the measuring device.

Accordingly, it is an object of the present invention to provide an improved meter for measuring the root mean square value of an input electrical signal which does not require the operator to perform any functions during an operating sequence.

Another object of the present invention is to provide a completely automatic meter for measuring the root mean square value of an input electrical signal which requires only a single thermal converter.

Other and further objects, features and advantages of this invention will become apparent as the description proceeds.

Briefly, in accordance with a preferred form of the present invention, there is provided a thermal converter comprising a resistance heating element proximately located to a thermocouple. A timing or sequencing device initially connects the resistance heating element to the unknown input signal and the thermocouple output leads to a device which stores a D.C. voltage equivalent to the output of the thermocouple. The sequencer then disconnects the resistance heating element from the unknown signal and connects it to a D.C. voltage or current source responsive to the voltage stored in the memory device and to the output voltage of the thermocouple. This source is then automatically varied until the thermocouple voltage equals the stored voltage. A direct current measuring device connected to the controlled direct current source provides an output which is proportional to the R.M.S. value of the unknown input signal.

A more thorough understanding of the invention may be obtained by a study of the following detailed description taken in connection with the accompanying drawings in which:

FIG. 1 illustrates a representative prior art non-automatic R.M.S. measuring device;

FIG. 2 illustrates schematically one embodiment of an R.M.S. meter constructed in accordance with this invention;

FIG. 3 illustrates particular circuit components which may be utilized in constructing the embodiment shown in FIG. 2;

FIG. 4 illustrates a circuit schematic of a preferred embodiment of the present invention; and FIG. 5 illustrates an R.M.S. digital voltmeter constructed in accordance with this invention.

Referring now to FIG. 2, a thermal converter 25 includes a resistance heating element 26 connected to movable contacts 27, 28 of double pole, double throw switch 29. Thermal converter 25 also includes a thermocouple 30 connected between ground and movable contact 31 of single pole, double throw switch 32. Switches 29 and 32 are preferably portions of a unitary relay driven by an actuator such as standard relay electromagnet 33. This electromagnet is driven by a sequencer or timing device 34 responsive to a read command.

Fixed contacts 40, 41 of switch 29 serve as the input terminals for the unknown signal. Corresponding other fixed contacts 42, 43 are connected to a controlled D.C. current or voltage source 44 which is responsively connected to a comparator 45. The output of the controlled source 44 is measured by a direct current or voltage measuring device 46.

Fixed contacts 47, 48 of switch 32 are respectively connected to the input of a D.C. voltage memory 49 and a first input 50 of the comparator 45. A second input 51 of the comparator is connected to the output of the voltage memory 49.

The operation of the R.M.S. measuring device shown in FIG. 2 is as follows: Upon receipt of a read command, the timing device 34 actuates the relay magnet 33 so as to drive the respective movable contacts 27, 28 and 31 to the position shown. The heater resistance 26 of the thermal converter 25 is then connected to the input unknown signal and the output of the thermocouple 30 is connected to the direct current voltage memory 49. As described above, the output of the thermocouple is a function of the average square of the input signal, this value being stored in the D.C. voltage memory 49.

This storage or memory device may contain means for electrical low-pass filtering which, in combination with the thermal filtering or averaging performed in the thermal converter 25, provides an improved average stored value near the lower A.C. frequency limits of the thermal converter. After a suitable preset time interval, during which the thermal converter reaches thermal equilibrium and the average output voltage is stored, the relay magnet 33 is disconnected from electrical power source to cause each of the movable contacts 27, 28, 31 to disengage from the respective fixed contacts 40, 41, 47 and engage the respective fixed contacts 42, 43, 48. The comparator 45 then compares the output of the thermocouple 30 with the stored voltage from the memory 49 and controls the output of the D.C. source 44 so that the two inputs of the comparator are made equal. The output of the thermocouple 30 is then equal to the D.C. voltage stored in the memory 49. When this condition is established, the D.C. output of the source 44 is equivalent to the R.M.S. value of the unknown input. This output may be either a current or voltage and read on an appropriate D.C. current or voltage measuring device. For a completely automatic measurement, a digital voltmeter would be preferably employed for the device 46.

Particular circuitry which may be employed for several of the block diagrams of FIG. 2 is shown in FIG. 3. As shown, the heater resistance 26 of the thermal converter 25 is connected between ground and the movable contact 60 of a relay having one additional movable contact 61 connected to the thermocouple 30 via input resistor 62. This relay is controlled by the relay magnet 33 and timing device 34 in response to a read command in manner described above. A capacitor 63 connected between the input and output of a very high gain, sign reversing operational amplifier 64 provides a D.C. voltage memory.

The operation of the D.C. storage is as follows: When the movable contact 61 connects the output of the thermocouple 30 to the input of the amplifier 64, as shown, the capacitor will be charged by amplifier 64 to a voltage which depends on the thermocouple voltage and the ratio of the feedback resistor 65 to the input resistor 62. Feedback resistor 65 is adapted to be connected between the input and output of the amplifier when movable contact 61 is actuated to the position shown. When the feedback resistor is removed from the input junction of the amplifier, the amplifier output voltage will remain at its last value because of the capacitor storage. This, then provides the memory or storage function.

Following the storage of the thermocouple output, the relay magnet 33 is disengaged from the power source. As a result, movable contacts 60 and 61 are connected to the opposite fixed contacts wherein the heater resistance 26 is connected to the output of a comparator comprising a second operational amplifier 66 having a stabilizing impedance 67 connected between its input and output terminals. Respective inputs to the comparator comprise the thermocouple 30 via input summing resistor 62 and the storage capacitor 63 via resistor 65 (which then functions as a summing resistor). The output level of the amplifier 66 into the thermal converter 25 tends by servo operation to reach a level at which the currents through summing resistors 62 and 65 are equal. Under this condition, the output of the amplifier 66 is equal to the R.M.S. value of the original input signal. This value may be read on a suitable voltmeter 68 connected to the output of the amplifier 66.

A preferred embodiment of this invention is shown in FIG. 4. This embodiment offers a completely automatic R.M.S. meter which requires relatively few components including only a single operational amplifier 75. Initially, the timing device, upon receipt of a read command, energizes the relay magnet 33 to actuate the movable contacts 76, 77 to the position shown. The heater resistance 26 is then connected to the unknown input signal. Thermocouple 30 of the thermal converter 25 is directly connected via input resistor 78 to the input of operational amplifier 75. A D.C. blocking impedance (e.g. a capacitor) 79 is connected between the input and output of amplifier 75 to stabilize it during the brief time interval that switches 76 and 77 are actuated. Without this impedance, the output of the amplifier would be disconnected from the remainder of the circuit for the time period required for the switches to break and make circuit. The storage capacitor 81 is charged by the output of the amplifier 75 to a D.C. voltage corresponding to the output of the thermocouple 30.

After a preset time, the timing device 34 disconnects the current from the relay magnet 33. Each of the movable contacts 76, 77 then transfer to their opposite positions wherein the heater resistance 26 is connected to the output of amplifier 75 via contact 76 and a voltmeter 80 is connected to the output of the amplifier 75 via contact 77. During this latter portion of the measurement, amplifier 75 serves as a comparator device, comparing the output of the thermocouple 30 and the output of the capacitor 81. In order to prevent discharging of the capacitor 81 during this portion of the sequence, an unloading device 82 such as a cathode follower circuit is connected between the capacitor 81 and the summing resistor 83. Amplifier 75 operating as a comparator provides an amount of current through a heater resistor 26 necessary to equate the thermocouple output voltarge with the voltage stored by the capacitor 81. The voltage output of the amplifier 75 is then equal to the R.M.S. value of the input signal and is read by the voltmeter 80.

An R.M.S. digital voltmeter may be constructed as shown in FIG. 5 by substituting an analog-to-digital converter for the operational amplifier 66 of the system shown above in FIG. 3. For simplicity, those components which may be identical to those shown in FIG. 3 bear the same nomenclature numerals. This analog-to-digital converter includes a comparator and control 90 whose input is connected to fixed switch contact 91. This contact is connected to the common junction of the summing resistors 62 and 65 when the relay magnet 33 is disconnected from a source of power by the timing device 34. The output of the comparator and control 90 is connected to the input of a digital-to-analog converter (D.A.C.) 92. A direct current reference source 93 is also connected as an input to the digital-to-analog converter 92. An example of a digital-to-analog converter is a digitally controlled attenuator which supplies voltages at its output which are predetermined fraction of the D.C. reference voltage 93. A specific embodiment of such a device is described in U.S. Patent No. 2,994,862—Howard G. Preston, assigned to Beckman Instruments, Inc., assignee of the present invention. The output of the converter is connected to a visual digital readout 94.

The operation of the digital R.M.S. measuring device shown in FIG. 5 is as follows: The initial portion of the measurement is identical to that of the apparatus shown in FIG. 3 and described above. Thus, a voltage is initially stored on the capacitor 63 which is a function of the R.M.S. value of the unknown input signal applied to the movable contact 60. Upon release of the movable contacts 60, 61 the comparator 90 receives an input voltage equal to the difference between the thermocouple output voltage and the voltage stored in capacitor 63. The output of the comparator causes the digital-to-analog converter to sequentially apply stepped D.C. voltages to the heater resistor 26 via movable contact 60. At such time as the thermocouple voltage and storage voltage are equated, the comparator 90 will discontinue operating the digital-to-analog converter 92. The particular D.C. level output of the converter then indicated on the visual readout 94 provides a digital output value equal to the R.M.S. value of the unknown signal input.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:

1. A meter for measuring the root mean square value of an input electrical signal comprising:
    a thermal converter element;
    storage means for storing an electrical signal;
    comparator means for comparing two input signals and generating a control signal indicative of the difference therebetween;
    control means for connecting the input of said thermal converter element to said input electrical signal and the output of said thermal converter element to said storage means for an initial period and subsequently and automatically connecting the input of said thermal converter to said control signal and the storage means and the output of the thermal converter element as the respective input signals of said comparator means so that the output signal of said thermal converter element is made substantially equal to the signal stored in said storage means; and
    means for measuring the value of said control signal, said measured value being equal to the root mean square value of said input electrical signal.

2. The meter defined in claim 1 wherein said storage means comprises:
    an amplifier having a capacitor connected between its input and its output.

3. The meter defined in claim 1 wherein:
    said storage means comprises a capacitor; and
    means for isolating said capacitor from said comparator means for preventing discharging of the signal stored upon said capacitor.

4. The meter defined in claim 1 wherein:
    said comparator means comprises an amplifier having a stabilizing impedance connected between its input and its output.

5. The meter defined in claim 1 wherein:
    said comparator means comprises an analog-to-digital converter.

6. The meter defined in claim 5 wherein said analog-to-digital converter comprises:
    a comparator and control connected to the output of said thermal converter element and the output of said storage means; and
    a digital-to-analog converter actuated by the output of said comparator and control and connected to a direct current reference for supplying digitally weighted control signals to the input of said thermal converter element.

7. The meter defined in claim 6 wherein:
    said means for measuring the value of said control signal comprises digital readout means for determining the digital value being generated by said digital-to-analog converter.

8. The meter defined in claim 1 wherein:
    said storage means comprises a capacitor; and wherein an amplifier is used to charge said capacitor during the initial period of said control means, said amplifier being subsequently included within said comparator means.

9. A meter for measuring the root mean square value of an input electrical signal comprising:
    a thermal converter element;
    storage means for storing an electrical signal;
    comparison means responsive to first and second input signals for generating a measured output signal; and
    means for selectively connecting first the input of said thermal converter element to said input electrical signal and the output of said thermal converter element to said storage means and then the input of said thermal converter element to said measured output signal and the outputs of said storage means and said thermal converter element to said comparison means as said first and second input signals.

10. A meter for measuring the root mean square value of an input electrical current or voltage comprising:
    a thermal converter element;
    a variable source of measured electrical power;
    control means for selectively connecting the input of said thermal converter element first to said input electrical current or voltage and then to said variable source of measured electrical power;
    storage means for storing an electrical voltage;
    comparator means for comparing two input signals and generating an error signal when they are of different magnitudes;
    means responsively connecting said measured variable source of electrical power to said error signal;
    means connected to said control means for selectively connecting the output of said thermal converter element first to said storage means and then to said comparator means as one of said input signals thereto; and
    means connecting said storage means to said comparator means as the other of said input signals thereto.

11. A meter for measuring the root mean square value of an input electrical signal comprising:
    a thermal converter element including an electrical heating element and a thermocouple;
    a first amplifier having a capacitor connected between its input and output;
    a comparator amplifier having a stabilizing impedance connected between its input and output;
    first and second resistors serially connected between the output of said thermocouple and the output of said first amplifier;
    first selector means for selectively connecting the mid-point of said resistors to either the input of said first amplifier or to the input of said comparator amplifier;
    means connected to the output of said comparator amplifier for measuring the signal level thereof;
    second selector means for selectively connecting the electrical heating element of said thermal converter element to either said input electrical signal or to the output of said comparator amplifier; and
    means connected to said first and second selector means for initially causing said mid-point of said resistors to be connected to the input of said first amplifier and said electrical heater to be connected to said input electrical signal, and after a subsequent predetermined period for causing said mid-point of said resistors to be connected to the input of said comparator amplifier and said electrical heating element to be connected to the output of said comparator amplifier.

12. A meter for measuring the root mean square value of an input electrical signal comprising:
    a thermal converter element including an electrical heater and a thermocouple;
    a capacitive storage element;
    means for first selectively charging said capacitor to the signal level appearing at the output of said thermocouple and then for comparing the output of said thermocouple with the signal level stored upon said capacitor to generate a signal proportional to the root mean square value of an input electrical signal; and
    means for selectively connecting the electrical heater of said thermocouple first to said input electrical signal and then to the output of said means for comparing said signals.

13. The meter described in claim 12 wherein said means for selectively charging said capacitor and for comparing said output and signal level comprises:
  an amplifier having a stabilizing impedance connected between its input and output;
  isolation means connecting said storage capacitor to the input of said amplifier; and
  resistance means connected between the output of said thermocouple and the input of said amplifier.

14. The meter described in claim 13 comprising:
  means for measuring the signal output of said amplifier; and
  switch means for selectively connecting the output of said amplifier to either said capacitor or to said signal measuring means.

15. A digital meter for measuring the root mean square value of an input electrical signal comprising:
  a thermal converter element;
  storage means for storing an electrical signal;
  switching means for first connecting the input of said thermal converter to said input electrical signal and the output of said thermal converter to said storage means;
  means for then comparing the output of said thermal converter element and the signal stored upon said storage element while the input of said thermal converter is disconnected from said input electrical signal;
  digital means connected to the input of said thermal converter element while comparing the output of said thermal converter element and the signal stored upon said storage element for generating digitally weighted signals in accordance with the output of said comparator means; and
  digital readout means for determining the output of said digital means.

16. A meter for measuring the root mean square value of an input electrical signal comprising:
  a thermal converter element including an electrical heater and a thermocouple;
  a capacitive storage element;
  means for initially connecting said electrical heater to said input electrical signal and said capacitive storage element to said thermocouple;
  means having two input terminals connected to said thermocouple and said capacitive storage element for subsequently supplying a variable controlled signal to said electrical heater until the output of said thermocouple is substantially equal to the voltage initially stored upon said capacitive storage element; and
  means for measuring the amplitude of said variable controlled signal to determine the root mean square value of said input electrical signal.

References Cited by the Examiner
UNITED STATES PATENTS

| | | | |
|---|---|---|---|
| 2,805,394 | 9/1957 | Hermach | 324—106 |
| 2,937,369 | 5/1960 | Newbold | 340—177 |
| 3,024,658 | 3/1962 | Huddleston | 73—362 |
| 3,054,951 | 9/1962 | Richard | 324—106 |

WALTER L. CARLSON, *Primary Examiner.*

RUDOLPH V. ROLINEC, *Examiner.*

J. J. MULROONEY, *Assistant Examiner.*